United States Patent
Inn et al.

(10) Patent No.: US 8,815,357 B1
(45) Date of Patent: Aug. 26, 2014

(54) POLYMER RESINS WITH IMPROVED PROCESSABILITY AND MELT FRACTURE CHARACTERISTICS

(71) Applicant: Chevron Phillips Chemical Company LP, The Woodlands, TX (US)

(72) Inventors: Yongwoo Inn, Bartlesville, OK (US); Qing Yang, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 13/778,693

(22) Filed: Feb. 27, 2013

(51) Int. Cl.
*B29D 22/00* (2006.01)
*C08F 10/00* (2006.01)
*C08F 10/02* (2006.01)
*B32B 1/08* (2006.01)

(52) U.S. Cl.
CPC .............. *C08F 10/00* (2013.01); *C08F 10/02* (2013.01); *Y10S 526/943* (2013.01); *B32B 1/08* (2013.01); *B32B 2597/00* (2013.01); *C08F 2500/05* (2013.01)
USPC ...... 428/35.7; 428/36.9; 525/240; 526/348.5; 526/943

(58) Field of Classification Search
CPC .............................. B32B 1/08; B32B 2597/00
USPC .................. 428/35.7, 36.9; 526/348.5, 348.2, 526/348.3, 348.4; 525/240, 199; 524/377
See application file for complete search history.

(56) References Cited

U.S. PATENT DOCUMENTS

| | | |
|---|---|---|
| 3,248,179 A | 4/1966 | Norwood |
| 4,501,885 A | 2/1985 | Sherk et al. |
| 4,588,790 A | 5/1986 | Jenkins, III et al. |

(Continued)

FOREIGN PATENT DOCUMENTS

| | | |
|---|---|---|
| WO | 2010/008964 A1 | 1/2010 |
| WO | 2012/030779 A1 | 3/2012 |
| WO | 2013/033690 A1 | 3/2013 |
| WO | 2013/181274 A2 | 12/2013 |

OTHER PUBLICATIONS

Cardin, D. J., et al., "Chemistry of Organo-Zirconium and -Hafnium Compounds," 1986, pp. 145-160 plus 5 pages of cover, publishing information, and contents, Halstead Press: a division of John Wiley & Sons, New York.

(Continued)

*Primary Examiner* — N. Edwards
(74) *Attorney, Agent, or Firm* — Conley Rose, P.C.; Rodney B. Carroll; Cheryl L. Huseman (57) ABSTRACT

A metallocene-catalyzed polymer comprising (i) a higher molecular weight component and (ii) a lower molecular weight component wherein the polymer has a polydispersity index of from about 10 to about 26; a zero shear viscosity of from about $5 \times 10^5$ Pa·s to about $2 \times 10^{14}$ Pa·s and a smooth-to-matte transition critical stress of from about 20 kPa to about 85 kPa at a shear rate of from about 1.5 s$^{-1}$ to about 17 s$^{-1}$. A dual metallocene catalyzed polyethylene comprising (i) a higher molecular weight component and (ii) a lower molecular weight component wherein the polymer has a polydispersity index of from about 10 to about 26; a zero shear viscosity of from about $5 \times 10^5$ Pa·s to about $2 \times 10^{14}$ Pa·s and a smooth-to-matte transition stress of from about 20 kPa to about 85 kPa at a shear rate of from about 1.5 s$^{-1}$ to about 17 s$^{-1}$.

22 Claims, 2 Drawing Sheets

(56) References Cited

U.S. PATENT DOCUMENTS

| | | |
|---|---|---|
| 4,939,217 A | 7/1990 | Stricklen |
| 5,191,132 A | 3/1993 | Patsidis et al. |
| 5,210,352 A | 5/1993 | Alt et al. |
| 5,347,026 A | 9/1994 | Patsidis et al. |
| 5,352,749 A | 10/1994 | DeChellis et al. |
| 5,399,636 A | 3/1995 | Alt et al. |
| 5,401,817 A | 3/1995 | Palackal et al. |
| 5,420,320 A | 5/1995 | Zenk et al. |
| 5,436,304 A | 7/1995 | Griffin et al. |
| 5,436,305 A | 7/1995 | Alt et al. |
| 5,451,649 A | 9/1995 | Zenk et al. |
| 5,455,314 A | 10/1995 | Burns et al. |
| 5,496,781 A | 3/1996 | Geerts et al. |
| 5,498,581 A | 3/1996 | Welch et al. |
| 5,541,272 A | 7/1996 | Schmid et al. |
| 5,554,795 A | 9/1996 | Frey et al. |
| 5,563,284 A | 10/1996 | Frey et al. |
| 5,565,175 A | 10/1996 | Hottovy et al. |
| 5,565,592 A | 10/1996 | Patsidis et al. |
| 5,571,880 A | 11/1996 | Alt et al. |
| 5,575,979 A | 11/1996 | Hanson |
| 5,594,078 A | 1/1997 | Welch et al. |
| 5,631,203 A | 5/1997 | Welch et al. |
| 5,631,335 A | 5/1997 | Alt et al. |
| 5,654,454 A | 8/1997 | Peifer et al. |
| 5,668,230 A | 9/1997 | Schertl et al. |
| 5,705,478 A | 1/1998 | Boime |
| 5,705,579 A | 1/1998 | Hawley et al. |
| 6,187,880 B1 | 2/2001 | Welch et al. |
| 6,239,235 B1 | 5/2001 | Hottovy et al. |
| 6,262,191 B1 | 7/2001 | Hottovy et al. |
| 6,509,427 B1 | 1/2003 | Welch et al. |
| 6,833,415 B2 | 12/2004 | Kendrick et al. |
| 7,026,494 B1 | 4/2006 | Yang et al. |
| 7,304,118 B2 * | 12/2007 | Lee et al. .................. 526/348.3 |
| 7,803,629 B2 * | 9/2010 | DesLauriers et al. ........... 436/85 |
| 7,960,487 B2 * | 6/2011 | Yang et al. .................... 526/113 |
| 8,039,556 B2 | 10/2011 | Krishnaswamy et al. |
| 2005/0085600 A1 | 4/2005 | Ehrman |
| 2007/0043182 A1 | 2/2007 | Martin |
| 2007/0129518 A1 | 6/2007 | Maziers et al. |
| 2010/0092709 A1 | 4/2010 | Joseph |
| 2010/0190926 A1 | 7/2010 | Krishnaswamy |
| 2011/0201770 A1 * | 8/2011 | Yang et al. .................... 526/113 |
| 2011/0231349 A1 * | 9/2011 | Stacy et al. ...................... 706/12 |
| 2012/0059134 A1 | 3/2012 | Yang et al. |
| 2013/0053523 A1 * | 2/2013 | Jayaratne et al. ............. 526/113 |
| 2013/0059100 A1 * | 3/2013 | Hlavinka et al. ............. 428/35.7 |
| 2013/0059103 A1 * | 3/2013 | Yang et al. ................. 428/36.92 |
| 2013/0059140 A1 * | 3/2013 | Hlavinka et al. .............. 428/220 |

OTHER PUBLICATIONS

Inn, Yong Woo, "Melt fracture and wall slip of metallocene-catalyzed bimodal polyethylenes in capillary flow," Author Proof, J. Rheol., Mar./Apr. 2013, pp. 1-14 plus Author Query Form, vol. 57, No. 2, The Society of Rheology, Inc.

Wailes, P. C., et al., "Organometallic Chemistry of Titanium, Zirconium, and Hafnium," 1974, pp. 89, 91, 92, 150, 151, 155 plus 6 pages of cover, publishing information, and contents, Academic Press, New York.

Alt, Helmut G., et al., "C1-Bridged fluorenylidene cyclopentadienylidene complexes of the type (C13H8-CR1R2-C5H3R)ZrCl2 (R1, R2=alkyl, phenyl, alkenyl; R=H, alkyl, alkenyl, substituted silyl) as catalyst precursors for the polymerization of ethylene and propylene," Journal of Organometallic Chemistry, 1998, pp. 87-112, vol. 568, Elsevier Science S.A.

Alt, Helmut G., et al., "C1-verbrückte Fluorenyliden—Indenylidenkomplexe des Typs (C13H8-CR2-C9H6_nR'n) ZrCl2 (n=0, 1; R=Me, Ph, Butenyl; R'=Alkyl, Alkenyl) als Metallocenkatalysatorvorstufen für die Ethylenpolymerisation," Journal of Organometallic Chemistry, 1998, pp. 153-181, vol. 562, Elsevier Science S.A.

Bird, R. Byron, et al., "Dynamics of Polymeric Liquids," Fluid Mechanics, vol. 1, Second Edition, 1987, pp. xiii-xviii and 171-172 plus 2 pages cover and publishing information, John Wiley & Sons, Inc.

Hieber, C. A., et al., "Shear-Rate-Dependence Modeling of Polymer Melt Viscosity," Jul. 1992, pp. 931-938, vol. 32, No. 14, Polymer Engineering and Science.

Hieber, C. A., et al., "Some correlations involving the shear viscosity of polystyrene melts," 1989, pp. 321-332, vol. 28, No. 4, Rheologica Acta.

Janzen, J., et al., "Diagnosing long-chain branching in polyethylenes," Journal of Molecular Structure, 1999, pp. 569-584 plus 2 pages of comments and information, vol. 485-486, Elsevier Science B.V.

Kajigaeshi, Shoji, et al., "Selective Preparation of Fluorene Derivatives Using the t-Butyl Function as a Positional Protective Group," Bull. Chem. Soc. Jpn., Jan. 1986, pp. 97-103, vol. 59, No. 1, The Chemical Society of Japan.

Köppl, Alexander, et al., "Heterogeneous metallocene catalysts for ethlene polymerization," Journal of Molecular Catalysis A: Chemical, 2001, pp. 23-32, vol. 165, Elsevier Science B.V.

International Application No. PCT/US2014/018243 Search Report, dated May 15, 2014.

Foreign communication from a related counterpart application—International Search Report, PCT/US2014/018243, May 15, 2014, 5 pages.

* cited by examiner

POLYMER RESINS WITH IMPROVED PROCESSABILITY AND MELT FRACTURE CHARACTERISTICS

CROSS REFERENCE TO RELATED APPLICATIONS

Not applicable.

STATEMENT REGARDING FEDERALLY SPONSORED RESEARCH OR DEVELOPMENT

Not applicable.

BACKGROUND

The present disclosure generally relates to polymer compositions and methods of making and using same. More specifically the present disclosure relates to polymer compositions having improved processability and melt fracture characteristics.

FIELD

Polyolefins are plastic materials useful for making a wide variety of valued products due to their combination of features such as stiffness, ductility, barrier properties, temperature resistance, optical properties, availability, and low cost. In particular, polyethylene (PE) is one of the largest volume polymers consumed in the world. It is a versatile polymer that offers high performance relative to other polymers and alternative materials such as glass or metal.

There exists an ongoing need for improved polymer compositions displaying desired processing characteristics.

BRIEF SUMMARY

Disclosed herein is a metallocene-catalyzed polymer comprising (i) a higher molecular weight component and (ii) a lower molecular weight component wherein the polymer has a polydispersity index of from about 10 to about 26; a zero shear viscosity of from about $5 \times 10^5$ Pa·s to about $2 \times 10^{14}$ Pa·s and a smooth-to-matte transition critical stress of from about 20 kPa to about 85 kPa at a shear rate of from about 1.5 s$^{-1}$ to about 17 s$^{-1}$.

Also disclosed herein is a dual metallocene-catalyzed polyethylene comprising (i) a higher molecular weight component and (ii) a lower molecular weight component wherein the polymer has a polydispersity index of from about 10 to about 26; a zero shear viscosity of from about $5 \times 10^5$ Pa·s to about $2 \times 10^{14}$ Pa·s and a smooth-to-matte transition stress of from about 20 kPa to about 85 kPa at a shear rate of from about 1.5 s$^{-1}$ to about 17 s$^{-1}$.

DETAILED DESCRIPTION

Disclosed herein are novel polymers and methods of making and using same. Herein, the polymer refers both to a material collected as the product of a polymerization reaction (e.g., a reactor or virgin resin) and a polymeric composition comprising a polymer and one or more additives. In an embodiment, a monomer (e.g., ethylene) may be polymerized using the methodologies disclosed herein to produce a polymer of the type disclosed herein.

In an embodiment polymers of the type disclosed herein are characterized as metallocene-catalyzed polymers having improved processability and designated as POL-IPs. Additional features of POL-IPs are disclosed herein.

In an embodiment, a POL-IP of the type described herein may be prepared by any suitable methodology, for example by employing one or more catalyst systems, in one or more reactors, in solution, in slurry, or in the gas phase, and/or by varying the monomer concentration in the polymerization reaction, and/or by changing any/all of the materials or parameters involved in the production of the POL-IPs, as will be described in more detail later herein.

The POL-IP of the present disclosure can be produced using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an embodiment, any arrangement and/or any combination of reactors may be employed to produce the polymer of the present disclosure.

According to one embodiment, the polymerization reactor system may comprise at least one loop slurry reactor. Such reactors may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Typical slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another embodiment, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

In an embodiment, a method of preparing a POL-IP comprises contacting an olefin (e.g., ethylene) monomer with a catalyst system under conditions suitable for the formation of a polymer of the type described herein. In an embodiment, the catalyst system comprises a transition-metal complex. The terms "catalyst composition," "catalyst mixture," "catalyst system," and the like, do not depend upon the actual product resulting from the contact or reaction of the components of the mixtures, the nature of the active catalytic site, or the fate of the co-catalyst, the catalyst, any olefin monomer used to prepare a precontacted mixture, or the activator-support, after combining these components. Therefore, the terms "catalyst composition," "catalyst mixture," "catalyst system," and the like, can include both heterogeneous compositions and homogenous compositions.

In an embodiment, a catalyst system suitable for the preparation of a POL-IP comprises at least one metallocene-containing compound. Herein, the term "metallocene" describes a compound comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands include hydrogen, therefore the description "substituted derivatives thereof" in this disclosure comprises partially saturated ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like.

In an embodiment, a catalyst system suitable for the preparation of a POL-IP comprises at least two metallocene-containing compounds. Nonlimiting examples of metallocene-containing compounds suitable for use in this disclosure are described in more detail in U.S. Pat. Nos. 4,939,217; 5,191,132; 5,210,352; 5,347,026; 5,399,636; 5,401,817; 5,420,320; 5,436,305; 5,451,649; 5,496,781; 5,498,581; 5,541,272; 5,554,795; 5,563,284; 5,565,592; 5,571,880; 5,594,078; 5,631,203; 5,631,335; 5,654,454; 5,668,230; 5,705,478; 5,705,579; 6,187,880; 6,509,427; 7,026,494, and U.S. Patent App. Nos. 20100190926 A1 and 20120059134, each of which is incorporated by reference herein in its entirety. Other processes to prepare metallocene compounds suitable for use in this disclosure have been reported in references such as: Koppl, A. Alt, H. G. J. Mol. Catal. A. 2001, 165, 23; Kajigaeshi, S.; Kadowaki, T.; Nishida, A.; Fujisaki, S. The Chemical Society of Japan, 1986, 59, 97; Alt, H. G.; Jung, M.; Kehr, G. J. Organomet. Chem. 1998, 562, 153-181; and Alt, H. G.; Jung, M. J. Organomet. Chem. 1998, 568, 87-112; each of which is incorporated by reference herein in its entirety. The following treatises also describe such methods: Wailes, P. C.; Coutts, R. S. P.; Weigold, H. in Organometallic Chemistry of Titanium, Zirconium, and Hafnium, Academic; New York, 1974.; Cardin, D. J.; Lappert, M. F.; and Raston, C. L.; Chemistry of Organo-Zirconium and -Hafnium Compounds; Halstead Press; New York, 1986. In an embodiment, the POL-IP is prepared using a catalyst system comprising two metallocene-containing compounds and may be characterized as a dual metallocene polymer or a dual metallocene resin. In an embodiment such dual-metallocene catalysts may be used to prepare bimodal or bimodal-like resins of the type disclosed herein.

In an embodiment, the dual metallocene catalyst used for preparation of the POL-IP comprises an unbridged metallocene, designated MTE-A. In an embodiment, MTE-A is a compound that may be characterized by one of general formulas 1 or 2:

Formula 1

Formula 2 where each X is independently F, Cl, Br, I, methyl, benzyl, phenyl, H, $BH_4$, a hydrocarbyloxide group having up to 20 carbon atoms, a hydrocarbylamino group having up to 20 carbon atoms, a trihydrocarbylsilyl group having up to 20 carbon atoms, $OBR'_2$ wherein R' may be an alkyl group having up to 12 carbon atoms or an aryl group having up to 12 carbon atoms, and $SO_3R''$, wherein R'' may be an alkyl group having up to 12 carbon atoms or an aryl group having up to 12 carbon atoms; Y is a $CR_2$ or $SiR_2$ group where R is hydrogen or a hydrocarbyl group; $Cp^A$, $Cp^B$, $Cp^C$, and $Cp^D$ are each independently a substituted or unsubstituted cyclopentadienyl group, indenyl group, or flourenyl group and where any substituent on $Cp^A$, $Cp^B$, $Cp^C$, and $Cp^D$ can be H, a hydrocarbyl group having up to 18 carbon atoms or a hydrocarbylsilyl group having up to 18 carbon atoms. In an embodiment, MTE-A is a dinuclear compound wherein each metal moiety has the same structural characteristic described previously herein.

In an embodiment, the dual metallocene catalyst used for preparation of the POL-IP further comprises a bridged metallocene compound hereinafter designated MTE-B. In an embodiment, MTE-B can be characterized by one of general formulas 3 or 4:

Formula 3

Formula 4 where M is Ti, Zr or Hf; each X is independently F, Cl, Br, I, methyl, phenyl, benzyl, H, $BH_4$, a hydrocarbyloxide group having up to 20 carbon atoms, a hydrocarbylamino group having up to 20 carbon atoms, a trihydrocarbylsilyl group having up to 20 carbon atoms, $OBR'_2$ wherein R' may be an alkyl group having up to 12 carbon atoms or an aryl group having up to 12 carbon atoms, or $SO_3R''$ wherein R'' may be an alkyl group having up to 12 carbon atoms or an aryl group having up to 12 carbon atoms; Y is a $CR_2$, $SiR_2$, or $R_2CCR_2$ group which may be linear or cyclic and where R is hydrogen or a hydrocarbyl group; $Cp^A$, $Cp^B$, $Cp^C$, and $Cp^D$ are each independently a substituted or unsubstituted cyclopentadienyl group, indenyl group, or flourenyl group and where any substituent on $Cp^A$, $Cp^B$, $Cp^C$, and $Cp^D$ can be H, a hydrocarbyl group having up to 18 carbon atoms or a hydrocarbylsilyl group having up to 18 carbon atoms. E represents a bridging group which may comprise (i) a cyclic or heterocyclic moiety having up to 18 carbon atoms, (ii) a group represented by the general formula $E^A R^{3A} R^{4A}$, wherein $E^A$ is C, Si, Ge, or B, and $R^{3A}$ and $R^{4A}$ are independently H or a hydrocarbyl group having up to 18 carbon atoms, (iii) a group represented by the general formula —$CR^{3B}R^{4B}$—$CR^{3C}R^{4C}$—, wherein $R^{3B}$, $R^{4B}$, $R^{3C}$, and $R^{4C}$ are independently H or a hydrocarbyl group having up to 10 carbon atoms, or (iv) a group represented by the general formula $SiR_2$—$CR_2$ where X is Si or C and R is a hydrogen or hydrocarbyl group; or —$SiR^{3D}R^{4D}$—$SiR^{3E}R^{4E}$, wherein $R^{3D}$, $R^{4D}$, $R^{3E}$, and $R^{4E}$ are independently H or a hydrocarbyl group having up to 10 carbon atoms, and wherein at least one of $R^{3A}$, $R^{3B}$, $R^{4A}$, $R^{4B}$, $R^{3C}$, $R^{4C}$, $R^{3D}$, $R^{4D}$, $R^{3E}$, $R^{4E}$, or the substituent on Cp, $Cp_1$, or $Cp_2$, is (1) a terminal alkenyl group having up to 12 carbon atoms or (2) a dinuclear compound wherein each metal moiety has the same structural characteristic as MTE-B.

The POL-IP may comprise additives. Examples of additives include, but are not limited to, antistatic agents, colorants, stabilizers, nucleators, surface modifiers, pigments, slip agents, antiblocks, tackifiers, polymer processing aids, and combinations thereof. Such additives may be used singularly or in combination and may be contacted with the polymer before, during, or after preparation of the POL-IP as described herein. Such additives may be added via any suitable technique, for example during an extrusion or compounding step such as during pelletization or subsequent processing into an end use article.

In an embodiment, the POL-IP comprises polyethylene. For example the POL-IP may comprise a polyethylene homopolymer. It is to be understood that an inconsequential amount of comonomer may be present in the polymers disclosed herein and the polymer still be considered a homopolymer. Herein an inconsequential amount of a comonomer refers to an amount that does not substantively affect the properties of the polymer disclosed herein. For example a comonomer can be present in an amount of less than about 0.5 wt. %, 0.1 wt. %, or 0.01 wt. % based on the total weight of polymer.

In an alternative embodiment, the POL-IP comprises a polyethylene copolymer. Examples of suitable comonomers include without limitation unsaturated hydrocarbons having from 3 to 20 carbon atoms such as propylene, 1-butene, 1-pentene, 1-hexene, 3-methyl-1-butene, 4-methyl-1-pentene, 1-heptene, 1-octene, 1-nonene, 1-decene, and mixtures thereof. In some embodiments the POL-IP is copolymer of ethylene and 1-hexene. The applicability of the aspects and features disclosed herein to linear olefin polymers other than ethylene (e.g., propylene and 1-butylene) and olefin copolymers are also contemplated.

A POL-IP of the type described herein may be a multimodal resin. Herein, the "modality" of a polymer resin refers to the form of its molecular weight distribution curve, i.e., the appearance of the graph of the polymer weight fraction as a function of its molecular weight, as may be displayed by, for example, gel permeation chromatography (GPC). The polymer weight fraction refers to the weight fraction of molecules of a given size. A polymer having a molecular weight distribution curve showing a single peak may be referred to as a unimodal polymer, a polymer having a curve showing two distinct peaks may be referred to as bimodal or a bimodal-like polymer, a polymer having a curve showing three distinct peaks may be referred to as trimodal polymer, etc. Polymers having molecular weight distribution curves showing more than one peak may be collectively referred to as multimodal polymers or resins. It is acknowledged that, in some instances, a multimodal polymer may appear to have a single peak via, for example, GPC analysis, when in fact the polymer itself is multimodal. In such instances, overlap of peaks may obscure the presence of other peaks and may imply unimodality, when in fact multimodality is a more accurate representation of the nature of the polymer or polymers.

In an embodiment, the POL-IP is characterized as a bimodal-like resin. Such a bimodal-like resin may show two peaks in a GPC profile, but is different from the conventional bimodal resins. A GPC of a POL-IP of the type described herein may display the following identifiable features (i) a peak attributable to a higher molecular weight (HMW) component and (ii) a peak attributable to a lower molecular weight (LMW) component where the peak attributable to the HMW component and LMW component are not base line separated.

In an embodiment, the LMW component is present in the POL-IP in an amount ranging from about 70 weight percent (wt. %) to about 97 wt. %, alternatively from about 75 wt. % to about 95 wt. %, or alternatively from about 80 wt. % to about 90 wt. %. In an embodiment, the HMW component is present in the POL-IP in an amount ranging from about 3 wt. % to about 30 wt. %, alternatively from about 5 wt. % to about 25 wt. %, or alternatively from about 5 wt. % to about 20 wt. %. The individual components of the polymer composition can be obtained by deconvoluting a GPC of the polymer (i.e. POL-IP) as described in U.S. Patent Publication No. 20070298508 which is incorporated by reference herein in its entirety.

In an embodiment, the POL-IP has a weight average molecular weight ($M_w$) of from about 260 kg/mol to about 360 kg/mol, alternatively from about 280 kg/mol to about 350 kg/mol, or alternatively from about 290 kg/mol to about 340 kg/mol. In an embodiment, the POL-IP has a number average molecular weight ($M_n$) of from about 12 kg/mol to about 26 kg/mol, alternatively from about 13 kg/mol to about 25 kg/mol, or alternatively from about 14 kg/mol to about 24 kg/mol. In an embodiment, the POL-IP has a z-average molecular weight ($M_z$) of from about 1500 kg/mol to about 2500 kg/mol, alternatively from about 1550 kg/mol to about 2400 kg/mol, or alternatively from about 1600 kg/mol to about 2350 kg/mol. The weight average molecular weight describes the molecular weight distribution of a polymer composition and is calculated according to equation 1:

$$\overline{M}_w = \frac{\sum_i N_i M_i^2}{\sum_i N_i M_i} \qquad (1)$$

where $N_i$ is the number of molecules of molecular weight $M_i$. The molecular weight averages may be expressed in kilogram per mole (g/mol) or kiloDaltons and are determined by gel permeation chromatography. The number average molecular weight is the common average of the molecular weights of the individual polymers calculated by measuring the molecular weight of n polymer molecules, summing the weights, and dividing by n.

$$\overline{M}_n = \frac{\sum_i N_i M_i}{\sum_i N_i} \qquad (2)$$

The z-average molecular weight is a higher order molecular weight average which is calculated according to equation (3)

$$M_z = \Sigma n_i M_i^3 / \Sigma n_i M_i^2 (\text{kg mol}^{-1}) \qquad (3)$$

where $n_i$ is the amount of substance of species i and $M_i$ is the molar mass of species.

The POL-IP may further be characterized by a molecular weight distribution (MWD) for the entire polymer of from about 10 to about 26, alternatively from about 11 to about 25, or alternatively from about 12 to about 24. The POL-IP may further be characterized by a MWD for the HMW component of from about 1.3 to about 2, alternatively from about 1.4 to about 1.9, or alternatively from about 1.5 to about 1.9. The POL-IP may further be characterized by a MWD for the LMW component of from about 4 to about 9, alternatively from about 4.5 to about 9, or alternatively from about 5 to about 8. The MWD refers to the ratio of the weight average $M_w$ to $M_n$, which is also referred to as the polydispersity index (PDI) or more simply as polydispersity.

The POL-IP may further be characterized as having an $M_z/M_w$ of from about 5 to about 9, alternatively from about 5.5 to about 8.5, or alternatively from about 5.7 to about 8.

The POL-IP may be characterized by the degree of branching present in the individual components and/or in the composition as a whole. Short chain branching (SCB) is known for its effects on polymer properties such as stiffness, tensile properties, heat resistance, hardness, permeation resistance, shrinkage, creep resistance, transparency, stress crack resistance, flexibility, impact strength, and the solid state properties of semi-crystalline polymers such as polyethylene. In an embodiment, a polymer of the type disclosed herein (i.e., POL-IP) is further characterized by a reverse comonomer branching distribution or reverse short-chain branching distribution (SCBD) resulting in SCB that occurs primarily in the HMW component of the polymer. For example from about 50 percent (%) to about 85% of the SCB may be located within the HMW component of the POL-IP, alternatively from about 60% to about 80% or alternatively from about 65% to about 80%. Herein, the SCBD refers to the number of SCB per 1000 carbon atoms at each molecular weight across the MWD profile of a polymer.

In an embodiment, a polymer of the type disclosed herein (i.e. POL-IP) is characterized by a short-chain branching content of from about 0.5 to about 3.5 short chain branches per 1000 total carbon atoms, alternatively from about 0.5 to about 3, alternatively from about 1 to about 3, or alternatively from about 1 to about 2.5.

Long chain branching (LCB) exerts its effects on polymer rheology. A POL-IP may contain from about 0.002 to about 0.2 long chain branches (LCB) per about 1,000 total carbon atoms, alternatively from about 0.001 to about 0.1 LCB per about 1,000 total carbon atoms, or alternatively from about 0.003 to about 0.3 LCB per about 1,000 total carbon atoms; wherein the LCB content is determined by Janzen-Colby Model found in J. Janzen and R. H. Colby, *J. of Molecular Structure*, 485, 569 (1999).

The POL-IP may be characterized as having a density of from about 0.945 g/cc to about 0.955 g/cc, alternatively from about 0.948 g/cc to about 0.955 g/cc, or alternatively from about 0.950 g/cc to about 0.955 g/cc as determined in accordance with ASTM D 1505.

The POL-IP may be characterized as having a high-load melt index (HLMI) of from about 5 g/10 min. to about 12 g/10 min., alternatively from about 5 g/10 min. to about 10 g/10 min., alternatively from about 6 g/10 min. to about 10 g/10 min., or alternatively from about 6 g/10 min. to about 9 g/10 min. The HLMI refers to the amount of a polymer which can be forced through an extrusion rheometer orifice of 0.0825 inch diameter when subjected to a force of 21.6 kilograms in ten minutes at 190° C., as determined in accordance with ASTM D 1238.

In an embodiment, a POL-IP of the type described herein has a zero shear viscosity ($E_o$), in the range of from about $5\times10^5$ Pa-s to about $2\times10^{14}$ Pa-s, alternatively from about $5\times10^5$ Pa-s to about $1.5\times10^{14}$ Pa-s, alternatively from about $6\times10^5$ Pa-s to about $1.5\times10^{14}$ Pa-s, or alternatively of from about $6\times10^5$ Pa-s to about $1.3\times10^{14}$ Pa-s as determined in accordance with Carreau-Yasuda (CY) model which is represented by equation (4) when n=0.1818:

$$E = E_o[1 + (T_\xi \dot{\gamma})^a]^{\frac{n-1}{a}} \qquad (4)$$

where
E=viscosity (Pa·s)
$\dot{\gamma}$=shear rate (1/s)
a=rheological breadth parameter
$T_\xi$=relaxation time (s) [describes the location in time of the transition region]
$E_o$=zero shear viscosity (Pa·s) [defines the Newtonian plateau]
n=power law constant [defines the final slope of the high shear rate region].

To facilitate model fitting, the power law constant n is held at a constant value. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume 1, Fluid Mechanics*, 2nd Edition, John Wiley & Sons (1987), each of which is incorporated by reference herein in its entirety.

The zero shear viscosity refers to the viscosity of the polymeric composition at a zero shear rate and is indicative of the materials molecular structure. Further, for polymer melts, the zero shear viscosity is often a useful indicator of processing attributes such as the melt strength of polymer melts in polymer processes. For example, the higher the zero shear viscosity, the better the melt strength.

In an embodiment, the POL-IP has an "a" value of from about 0.03 to about 0.4, alternatively from about 0.033 to about 0.39, alternatively from about 0.033 to about 0.385, or alternatively from about 0.035 to about 0.38 wherein the dynamic complex viscosity versus frequency scan are fitted to the Carreau-Yasuda equation with an n=0.1818 value.

In an embodiment, the POL-IP has an "tau eta" ($T_\xi$) value of from about 7 seconds (s) to about $2\times10^5$ s, alternatively from about 8 s to about $1.8\times10^5$ s, alternatively from about 8 s to about $1.5\times10^5$ s, or alternatively from about 9 s to about $1\times10^5$ s wherein the dynamic complex viscosity versus frequency scan are fitted to the Carreau-Yasuda equation with an n=0.1818 value.

In an embodiment, a POL-IP prepared as described herein may display reduced melt fracture during polymer melt formation and processing when compared to a typical dual-metallocene catalyzed polymer. The type, extent, and conditions under which the polymer melt experiences melt fracture may vary depending on the polymer microstructure. In an embodiment, a POL-IP of the type disclosed herein displays a reduced tendency to melt fracture as determined by measuring the shear stress as a function of shear rate using capillary rheometry.

Capillary rheometry is a technique whereby a sample undergoes extrusion through a die of defined dimensions and the shear pressure drop across the die is recorded at set volumetric flow rates. In an embodiment, a POL-IP is the subject of a capillary extrusion experiment to characterize the melt fracture behavior of the polymer. The capillary extrusion experiment may be carried out using any suitable methodology. For example, the capillary extrusion experiments may be carried out at 190° C., using a dual-bore capillary rheometer (Rosand RH-7, Malvern) operated in constant speed mode. A capillary die with 1 mm diameter and of 16 mm length and an orifice die with 1 mm diameter may be used. The entrance angle for the dies can be 180°, and the contraction ratio from the reservoir barrel to the die may be about 15. A step shear rate test can be performed for a given sample to obtain the apparent wall shear rate ($\dot{\gamma}_A$) and apparent wall shear stress ($\sigma_A$) according to equation 5:

$$\dot{\gamma}_A = \frac{4Q}{\pi R^3} \text{ and } \sigma_A = \frac{R}{2}\frac{\Delta P}{L} \qquad (5)$$

where R is the capillary radius, ΔP is the measured pressure drop across the capillary, L is the capillary length, and Q is the imposed flow rate. Bagley and Rabinowitsch corrections are applied to obtain more realistic shear stress value at the wall ($\sigma_W$) and shear rate ($\dot{\gamma}_W$) respectively according to equation 6:

$$\sigma_W = \frac{R}{2}\frac{(\Delta P - P_o)}{L} \text{ and } \dot{\gamma}_W = \left(\frac{3+b}{4}\right)\dot{\gamma}_A \qquad (6)$$

where $P_O$ is measured pressure for the orifice die and b=d(log $\dot{\gamma}_A$)/d(log $\sigma_W$). Extrudates can be collected at different shear rates and imaged using an optical microscope to identify onset critical stresses and shear rates of the melt fractures.

In an embodiment, POL-IPs display a smooth to matte transition that occurs at a critical stress of from about 20 kPa to about 85 kPa, alternatively from about 30 kPa to about 80 kPa or alternatively from about 35 kPa to about 70 kPa. The critical stress refers to the wall shear stresses that serves as the trigger for the onset of a particular extrudate distortion or melt fracture. The smooth to matte transition may also be referred to as surface melt fracture (SMF) or the sharkskin melt fracture (SSMF). The onset of the smooth to matte transition is a polymer instability that originates at the exit of a die during extrusion of melted polymer (i.e., melt) through the die. The smooth to matte transition may be attributable to the acceleration (high stretching rate) of the melt as it exits the die. Without wishing to be limited by theory, it is hypothesized that melt leaving the die in the neighborhood of the wall experiences a large, rapid, tensile deformation as the velocity field adjusts from the no-slip boundary condition to the free-surface condition. The large stresses on the free surface cause periodic cracks that result into small amplitude periodic distortions termed sharkskin, which is a visible surface defect present in the product being produced from the die (e.g., pipe). The critical stress is related to the onset of the smooth to matte transition. In an embodiment, a POL-IP may display a smooth-to-matte transition that occurs at a critical shear rate of from about 1.5 s$^{-1}$ to about 17 s$^{-1}$, alternatively from about 1.2 s$^{-1}$ to about 16.5 s$^{-1}$, alternatively from about 1.8 s$^{-1}$ to about 16.5 s$^{-1}$, alternatively from about 1.4 s$^{-1}$ to about 16 s$^{-1}$, or alternatively from about 1.6 s$^{-1}$ to about 18 s$^{-1}$. Herein, the shear rate refers to the extrusion speed that serves as the trigger for the onset of a particular extrudate distortion or melt fracture.

In an embodiment, the POL-IPs display a magnitude of slip-stick fracture (SSF) at from about 200 psi to about 1200 psi, alternatively from about 217 psi to about 1100 psi, alternatively from about 210 psi to about 1100 psi, or alternatively from about 220 psi to about 1000 psi. SSF is believed to occur when the shear stress at the die wall exceeds the critical stress. When this occurs, the melt jerks forward as a plug, relieving the pressure behind it and allowing the oriented chain segments to recoil somewhat. Once the pressure is relieved, the rate of movement of the polymer slows and it re-establishes the non-slip boundary condition. During SSF the pressure within the die fluctuates and the polymer output is unsteady. The magnitude of SSF pressure oscillation is recorded and correlated with the onset of melt fractures.

A POL-IP may display improved processability as indicated by the N__100 value which is the slope viscosity curve at 100 rad/s frequency. The N__100 is often a useful indicator of output in polymer processes. For example, a POL-IP may have a N__100 value of from about 0.2 to about 0.5, alternatively from about 0.23 to about 0.49, or alternatively from about 0.25 to about 0.47.

Additional improvements in processing may include a decrease in the head pressure. The viscosity at 100 rad/s is a useful indicator that correlates with the extrusion pressure in polymer processes. For example, a POL-IP may have a viscosity at 100 rad/s value of from $2 \times 10^3$ Pa·s to about $2.4 \times 10^3$ Pa·s, alternatively from about $1.9 \times 10^3$ Pa·s to about $2.3 \times 10^3$ Pa·s, alternatively from about $1.8 \times 10^3$ Pa·s to about $2.2 \times 10^3$ Pa·s.

In an embodiment, the POL-IP is contacted with one or polymer processing aids (PPAs) to form a POL-IP composition or POL-IPC. A PPA functions to improve the processing characteristics of the polymer and to eliminate surface related imperfections that occur during processing. Any suitable PPA may be contacted with the POL-IP to form a composition suitable for use in this disclosure. Examples of PPAs suitable for use with POL-IPs include without limitation fluoroelastomers, polyethylene glycol, low molecular weight polyethylene waxes and combinations thereof. In an aspect, the PPA is a fluoroelastomer. POL-IPCs may display processing and/or melt fracture characteristics that are similar to those previously described herein for the POL-IP. In some embodiments, the processing and/or melt fracture characteristics of the POL-IPCs are improved with respect to that of the POL-IP. In an embodiment a POL-IP of the type disclosed herein is characterized by the ability to form a composition with a PPA (e.g., fluoroelastomer) (i.e., to form a POL-IPC) that has improved processing and/or melt fracture characteristics.

POL-IPs as described herein may be formed into various articles, including but not limited to, household containers, utensils, film products, drums, fuel tanks, pipes, geomembranes, and liners. In an aspect, the POL-IP of this disclosure is fabricated into a pipe by a plastics shaping process such as extrusion.

Pipe extrusion in the simplest terms is performed by melting, conveying polyethylene pellets into a particular shape (generally an annular shape), and solidifying that shape during a cooling process. There are numerous steps to pipe extrusion as provided below. The polymer feedstock can either be a pre-pigmented polyethylene resin or it can be a mixture of natural polyethylene and color concentrate (referred to as "Salt and Pepper blends"). In North America, the most common feedstock for pipe extrusion is "Salt and Pepper blends." In Europe and other areas of the world, the most common feedstock for pipe extrusion is pre-pigmented polyethylene resin. Feedstock is rigidly controlled to obtain the proper finished product (pipe) and ultimate consumer specifications.

The feedstock is then fed into an extruder. The most common extruder system for pipe production is a single-screw extruder. The purpose of the extruder is to melt, convey, and homogenize the polyethylene pellets. Extrusion temperatures typically range from 178° C. to 250° C. depending upon the extruder screw design and flow properties of the polyethylene.

The molten polymer is then passed through a die. The die distributes the homogenous polyethylene polymer melt around a solid mandrel, which forms it into an annular shape. Adjustments can be made at the die exit to try to compensate for polymer sag through the rest of the process. In order for the pipe to meet the proper dimensional parameters, the pipe is then sized. There are two methods for sizing: vacuum or pressure. Both employ different techniques and different equipment.

Next, the pipe is cooled and solidified in the desired dimensions. Cooling is accomplished by the use of several water tanks where the outside pipe is either submerged or water is sprayed on the pipe exterior. The pipe is cooled from the outside surface to the inside surface. The interior wall and inside surfaces of the pipe can stay very hot for a long period of time, as polyethylene is a poor conductor of heat. Finally, the pipe is printed and either coiled or cut to length.

EXAMPLES

Molecular weight and molecular weight distributions were obtained using a PL-GPC 220 (Polymer Labs, an Agilent Company) system equipped with a IR4 detector (Polymer Char, Spain) and three Styragel HMW-6E GPC columns (Waters, MA) running at 145° C. The flow rate of the mobile phase 1,2,4-trichlorobenzene (TCB) that contains 0.5 g/L 2,6-di-t-butyl-4-methylphenol (BHT) was set at 1 mL/min and the concentration of polymer solutions was generally kept in the range of 1.0-1.5 mg/mL, depending on the molecular weight. Sample preparation was conducted at 150° C. for nominally 4 h with occasional and gentle agitation before the solutions being transferred to sample vials for injection. The integral calibration method was used to deduce molecular weights and molecular weight distributions using a Chevron Phillips Chemicals Company's HDPE polyethylene resin, MARLEX BHB5003, as the broad standard. The integral table of the broad standard was pre-determined in a separate experiment with SEC-MALS.

For the dynamic frequency sweep measurement, the PE pellet samples (i.e. POL-IPs) were compression molded at 182° C. for a total of 3 minutes. The samples were allowed to melt at a relatively low pressure for 1 minute and then subjected to a high molding pressure for additional 2 minutes. The molded samples were then quenched in a cold (room temperature) press, and then 25.4 mm diameter disks were stamped out of the molded slabs for the measurement in a rotational rheometer. The measurements were performed in parallel plates of 25 mm in diameter at 190° C. using a controlled-stress rheometer equipped with an air bearing system (Physica MCR-500, Anton Paar). The test chamber of the rheometer was purged with nitrogen to minimize oxidative degradation. After thermal equilibration, the specimens were squeezed between the plates to a 1.6 mm thickness, and the excess was trimmed. The dynamic frequency sweep test was performed with 1~10% strain in the LVE regime at angular frequencies from 0.0316 to 316 rad/s. Smaller strain values were used for high viscosity samples to avoid overloading the torque transducer and to keep within the linear viscoelastic limits of the sample. The instrument automatically reduces the strain at high frequencies if necessary to keep from overloading the torque transducer. These data were fit to the Carreau-Yasuda equation to determine zero shear viscosity ($\eta_0$), relaxation time ($\tau$), and a measure of the breadth of the relaxation time distribution (CY-a).

Melt fracture behavior was determined by capillary rheometry. Capillary extrusion experiments were carried out at 190° C., using a dual-bore capillary rheometer (Rosand RH-7, Malvern) operated in constant speed mode. A capillary die with 1 mm diameter and of 16 mm length and an orifice die with 1 mm diameter were used throughout this study. The entrance angle for the dies was 180°, and the contraction ratio from the reservoir barrel to the die was about 15. Bagley and Rabinowitsch corrections were applied to obtain steady shear stresses as a function of shear rate. The stresses obtained from the capillary experiments were compared with the magnitude of complex moduli measured from the dynamic frequency sweep tests. The extrudates were collected at different shear rates and imaged using an optical microscope to identify onset and evolution of the melt fractures.

Example 1

Figure 1:
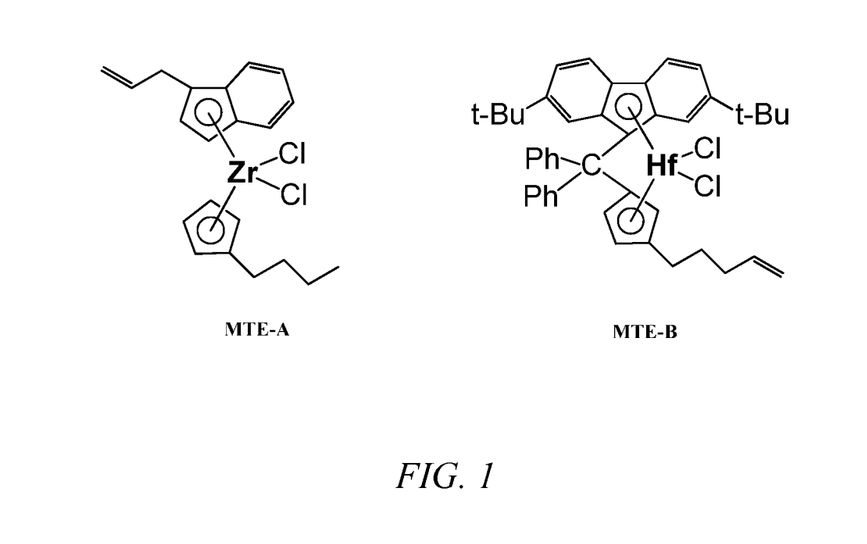
FIG. 1 depicts structures of compounds used in the preparation of the samples from example 1.

Four POL-IPs of the type disclosed herein were prepared as follows and designated Samples 1-4: Samples 1-3 were produced using the following polymerization procedure. All polymerization runs were conducted in a one-gallon stainless steel reactor with 1.8 L of isobutane. Both metallocene solutions of MTE-A and MTE-B were prepared at about 1 mg/mL in toluene. The Structures of MTE-A and MTE-B utilized in preparing the samples is shown in FIG. 1. Alkyl aluminum (triisobutylaluminum, Tiba), fluorided alumina, premixed MTE-A and MTE-B at the given ratio were added in that order through a charge port while slowly venting isobutane vapor. The charge port was closed and isobutane was added. The contents of the reactor were stirred and heated to the desired run temperature of about 92° C., and ethylene was then introduced into the reactor with 1-hexene and hydrogen. Ethylene and hydrogen were fed on demand at the specified weight ratio to maintain the target reactor pressure of 390 psig pressure for 45 min. The reactor was maintained at the desired temperature throughout the run by an automated heating-cooling system. Polymerization conditions and polymer information for Samples 1-3 are summarized in Table 1.

Sample 4 was produced using the following polymerization procedure. All polymerization runs were conducted in a one-gallon stainless steel reactor with 1.8 L of isobutane. Both metallocene solutions of MET-A and MTE-B were prepared at about 1 mg/mL in toluene. Alkyl aluminum (triisobutylaluminum, Tiba), sulfated alumina, premixed MTE-A and MTE-B at the given ratio were added in that order through a charge port while slowly venting isobutane vapor. The charge port was closed and isobutane was added. The contents of the reactor were stirred and heated to the desired run temperature of about 92° C., and ethylene was then introduced into the reactor with 1-hexene and hydrogen. Ethylene and hydrogen were fed on demand at the specified weight ratio to maintain the target reactor pressure of 390 psig pressure for 40 min. The reactor was maintained at the desired temperature throughout the run by an automated heating-cooling system. Polymerization conditions and polymer information are summarized in Table 2. Two batches of the polymer were produced and combined.

TABLE 1

| Sample No | Metallocene (I) | Metallocene (II) | MTE-A/MTE-B (mg/mg) | H$_2$/Ethylene (ppm, wt) | Solid PE (g) | HLMI | Density (g/cc) | Mn/1000 | Mw/1000 | Mz/1000 |
|---|---|---|---|---|---|---|---|---|---|---|
| 1 | MTE-A | MTE-B | 1.2 mg/.7 mg | 100 | 369 | 9.7 | 0.9507 | 31.9 | 245.0 | 1597.5 |
| 2 | MTE-A | MTE-B | 1.2 mg/1.3 mg | 150 | 447 | 7.1 | 0.9497 | 14.1 | 322.1 | 1854.7 |
| 3 | MTE-A | MTE-B | 1.2 mg/1.4 mg | 175 | 374 | 7.8 | 0.9517 | 17.5 | 291.5 | 1364.4 |

Polymerization condition: 92 C./390 psi, 45 min, 5 g 1-hexene, 300 mg flourided alumina, 0.8 mmol Tiba

TABLE 2

| Sample No. | Metallocene (I) | Metallocene (II) | MTE-A/MTE-B (mg/mg) | H2/Ethylene (ppm, wt) | Solid PE | HLMI | Density | Mn/1000 | Mw/1000 | Mz/1000 |
|---|---|---|---|---|---|---|---|---|---|---|
| 4 | MTE-A | MTE-B | 1.2 mg/1.1 mg | 200 | 147 | 8.4 | 0.9482 | 22.0 | 294.1 | 1648.0 |

Figure 2:
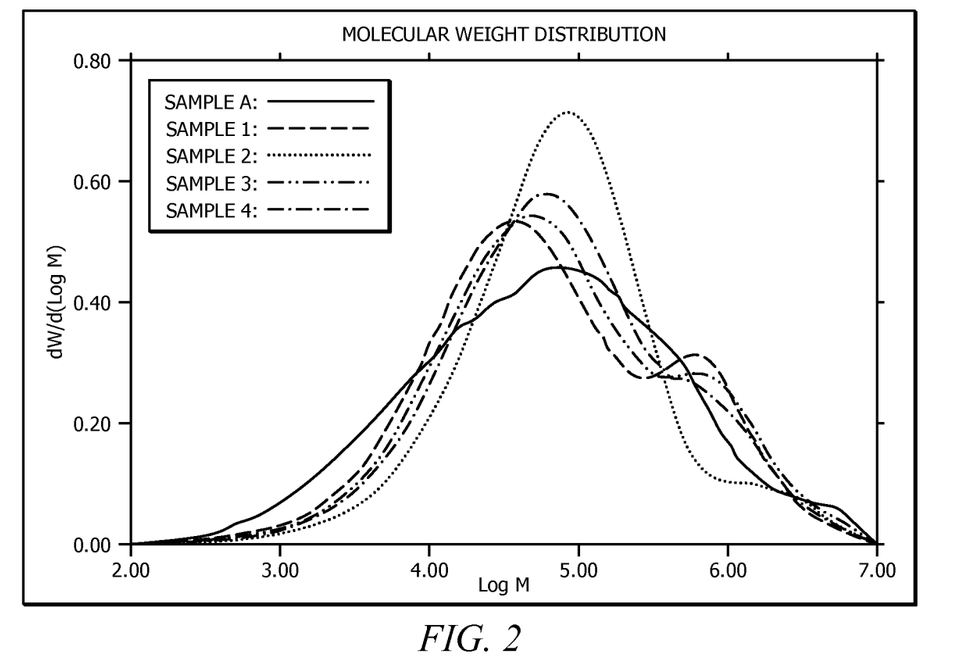
FIG. 2 is the molecular weight distribution profile of the samples from example 1.

Polymerization condition: 92 C./390 psi, 40 min, 6 g 1-hexene, 200 mg sulfated alumina, 0.8 mmol Tiba The MWD profiles of Samples 1-4 are presented in FIG. 2. Also shown in FIG. 2 is the MWD profile for comparative Sample A which is MARLEX H525 high density polyethylene which is a chromium-based resin (Cr-based resin) commercially available from Chevron Phillips Chemical Company LP.

The zero-shear viscosity, relaxation time and rheological breadth of the samples was determined and this data is presented in Table 3.

TABLE 3

| Sample | Zero Shear Viscosity (Pa s) | Relaxation Time (s) | Rheological Breadth (CY-a) |
|---|---|---|---|
| 1 | 5.56E+05 | 7.95E+00 | 0.3806 |
| 2 | 4.31E+13 | 5.83E+04 | 0.0341 |
| 3 | 1.66E+06 | 2.32E+01 | 0.2902 |
| 4 | 6.14E+06 | 6.42E+01 | 0.1866 |
| A | 9.14E+06 | 9.95E+01 | 0.1728 |

Figure 3:
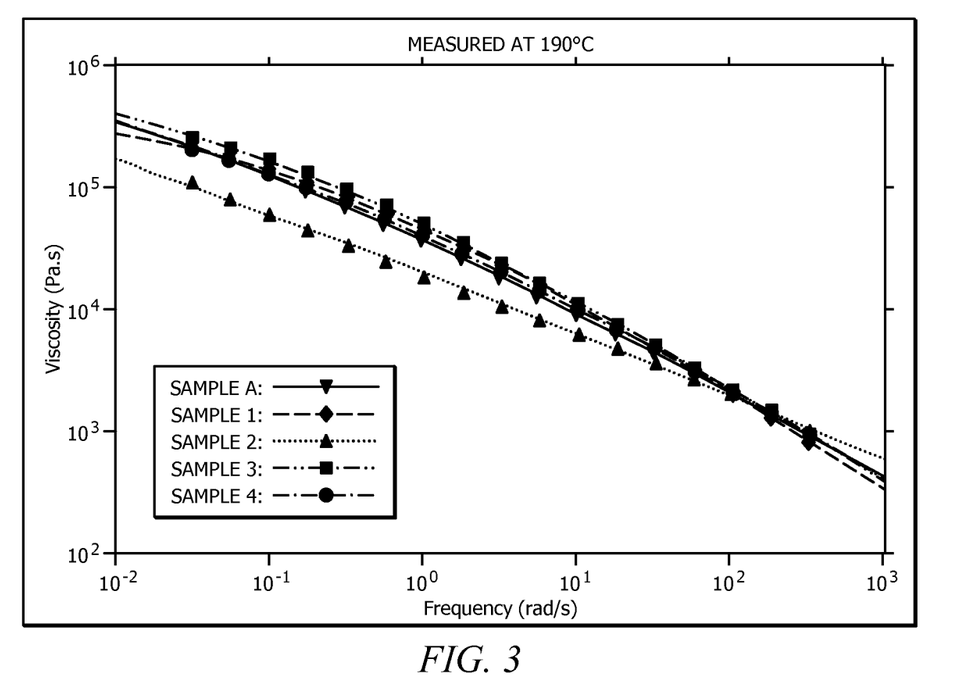
FIG. 3 is a plot of the viscosity as a function of frequency for the samples from example 1.

Samples 1-4 displayed broad rheological distributions and high zero-shear viscosities suggesting the samples melt strength and processability is similar to that of Cr-based resins. Additionally, FIG. 3 which is a graph of the viscosity as a function of frequency demonstrates that Samples 1-4 displayed viscosity curves similar to that of Cr-based resins.

Example 2

The melt fracture behavior of the POL-IPs was investigated. Specifically the melt fracture behavior of Samples 1-4 were assessed by capillary rheometry and this data is presented in Table 4. Samples 1B and Sample 2B were compositions prepared using the polymer of samples 1 and 2 respectively and a polymer processing aid (PPA) comprising fluoropolymer or fluoro-elastomer processing aids.

TABLE 4

| Sample No. | Smooth to Matte | | Slip-Stick transition | | |
|---|---|---|---|---|---|
|  | Stress (kPa) | Shear Rate (s$^{-1}$) | Stress (kPa) | Shear Rate (s$^{-1}$) | Magnitude (psi) |
| 1 | 36.5 | 2.12 | 201.7 | 357 | 217.2 |
| 1B | 47.7 | 4.89 | — | — | — |
| 2 | 77.7 | 16.6 | 271.8 | 323 | 1103.1 |
| 2B | — | — | 349.1 | 1450 | 423.7 |
| 3 | 38.3 | 1.86 | 202.9 | 295 | 409.1 |
| 4 | <30.2 | <1.21 | 242.5 | 350 | 735.9 |
| A | 35.7 | 1.89 | 193 | 353 | 84 |

The results demonstrate that the magnitude of slip-stick oscillation of Samples 1-4 (i.e., POL-IPs) is larger than that of the Cr-based resin (i.e., Sample A) indicating that Samples 1-4 have good melt fracture potential. Samples 1-4 displayed a relatively low onset of stresses of smooth-to-matte transition which is similar to that of Sample A and may be attributable to the presence of the HMW tails in these samples. Overall the melt fracture behavior of Samples 1-4 is expected to be similar to that of the Cr-based resin.

Further the Samples 1B and 2B containing a PPA had melt fracture behavior that was characterized by a delay in or the disappearance of the smooth-to-matte transition and a reduction in or disappearance of the slip-stick transition.

ADDITIONAL DISCLOSURE

The following enumerated embodiments are provided as non-limiting examples.

A first embodiment which is a metallocene-catalyzed polymer comprising (i) a higher molecular weight component and (ii) a lower molecular weight component wherein the polymer has a polydispersity index of from about 10 to about 26; a zero shear viscosity of from about 5×10$^5$ Pa·s to about 2×10$^{14}$ Pa·s and a smooth-to-matte transition critical stress of from about 20 kPa to about 85 kPa at a shear rate of from about 1.5 s$^{-1}$ to about 17 s$^{-1}$.

A second embodiment which is the polymer of the first embodiment wherein the higher molecular weight component is present in an amount of from about 3 wt. % to about 30 wt. %.

A third embodiment which is the polymer of any of the first through second embodiments wherein the lower molecular weight component is present in an amount of from about 70 wt. % to about 97 wt. %.

A fourth embodiment which the polymer of any of the first through third embodiments having a weight average molecular weight of from about 260 kg/mol to about 350 kg/mol.

A fifth embodiment which is the polymer of any of the first through fourth embodiments having a number average molecular weight of from about 12 kg/mol to about 26 kg/mol.

A sixth embodiment which is the polymer of any of the first through fifth embodiments having a z-average molecular weight of from about 1500 kg/mol to about 2500 kg/mol.

A seventh embodiment which is the polymer of any of the first through sixth embodiments having a short-chain branching content of from about 0.5 SCB/1000C to about 3.5 SCB/1000C wherein from about 50% to about 80% of the short chain branches are located in the higher molecular weight component.

An eighth embodiment which is the polymer of any of the first through seventh embodiments having a long-chain branching content of from about 0.002 branches per 1000 carbon to about 0.2 branches per 1000 carbon.

A ninth embodiment which is the polymer of any of the first through eighth embodiments having a high load melt index of from about 5 to about 12.

A tenth embodiment which is the polymer of any of the first through ninth embodiments having a CY-a parameter of from about 0.03 to about 0.4.

An eleventh embodiment which is the polymer of any of the first through tenth embodiments having a tau eta value of from about 7 s to about $2.0 \times 10^5$ s.

A twelfth embodiment which is the polymer of any of the first through eleventh embodiments having a magnitude of slip-stick fracture of from about 200 psi to about 1200 psi.

A thirteenth embodiment which is the polymer of any of the first through twelfth embodiments having an N_100 value of from about 0.2 to about 0.5.

A fourteenth embodiment which is the polymer of any of the first through thirteenth embodiments having a viscosity at 100 rad/s of from $2 \times 10^3$ Pa·s to about $2.4 \times 10^3$ Pa·s.

A fifteenth embodiment which is a composition comprising the polymer of any of the first through fourteenth embodiments and a polymer processing aid.

A sixteenth embodiment which is the polymer of the fifteenth embodiment wherein the polymer processing aid comprises fluoroelastomers, polyethylene glycol, low molecular weight waxes, or combinations thereof.

A seventeenth embodiment which is an article made from the polymer of any of the first through sixteenth embodiments.

An eighteenth embodiment which is an article made from the composition of the fifteenth embodiment.

A nineteenth embodiment which is a dual metallocene catalyzed polyethylene comprising (i) a higher molecular weight component and (ii) a lower molecular weight component wherein the polymer has a polydispersity index of from about 10 to about 26; a zero shear viscosity of from about $5 \times 10^5$ Pa·s to about $2 \times 10^{14}$ Pa·s and a smooth-to-matte transition stress of from about 20 kPa to about 85 kPa at a shear rate of from about $1.5\ s^{-1}$ to about $17\ s^{-1}$.

A twentieth embodiment which is a composition comprising the dual metallocene catalyzed polyethylene of the nineteenth embodiment and a fluoroelastomer.

A twenty-first embodiment which is a pipe made from the composition of any of the twentieth through twenty-first embodiments.

A twenty-second embodiment which is the polymer of any of the first through eighteenth embodiments wherein the polymer is a copolymer of ethylene and 1-hexene.

While embodiments of the disclosure have been shown and described, modifications thereof can be made without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $N_L$, and an upper limit, $N_U$, is disclosed, any number falling within the range is specifically disclosed. In particular, the following numbers within the range are specifically disclosed: $N = N_L + k^*(N_U - N_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two N numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference herein is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

The invention claimed is:

1. A metallocene-catalyzed polymer comprising (i) a higher molecular weight component and (ii) a lower molecular weight component wherein the polymer has a polydispersity index of from about 10 to about 26; a zero shear viscosity of from about $5 \times 10^5$ Pa·s to about $2 \times 10^{14}$ Pa·s and a smooth-to-matte transition critical stress of from about 20 kPa to about 85 kPa at a shear rate of from about $1.5\ s^{-1}$ to about $17\ s^{-1}$.

2. The polymer of claim 1 wherein the higher molecular weight component is present in an amount of from about 3 wt. % to about 30 wt. %.

3. The polymer of claim 1 wherein the lower molecular weight component is present in an amount of from about 70 wt. % to about 97 wt. %.

4. The polymer of claim 1 having a weight average molecular weight of from about 260 kg/mol to about 350 kg/mol.

5. The polymer of claim 1 having a number average molecular weight of from about 12 kg/mol to about 26 kg/mol.

6. The polymer of claim 1 having a z-average molecular weight of from about 1500 kg/mol to about 2500 kg/mol.

7. The polymer of claim 1 having a short-chain branching content of from about 0.5 SCB/1000C to about 3.5 SCB/1000C wherein from about 50% to about 80% of the short chain branches are located in the higher molecular weight component.

8. The polymer of claim 1 having a long-chain branching content of from about 0.002 branches per 1000 carbon to about 0.2 branches per 1000 carbon.

9. The polymer of claim 1 having a high load melt index of from about 5 to about 12.

10. The polymer of claim 1 having a CY-a parameter of from about 0.03 to about 0.4.

11. The polymer of claim 1 having a tau eta value of from about 7 s to about $2.0 \times 10^5$ s.

12. The polymer of claim 1 having a magnitude of slip-stick fracture of from about 200 psi to about 1200 psi.

13. The polymer of claim 1 having an N__100 value of from about 0.2 to about 0.5.

14. The polymer of claim 1 having a viscosity at 100 rad/s of from $2 \times 10^3$ Pa·s to about $2.4 \times 10^3$ Pa·s.

15. A composition comprising the polymer of claim 1 and a polymer processing aid.

16. The composition of claim 15 wherein the polymer processing aid comprises fluoroelastomers, polyethylene glycol, low molecular weight waxes, or combinations thereof.

17. An article made from the polymer of claim 1.

18. An article made from the composition of claim 15.

19. A dual metallocene catalyzed polyethylene comprising (i) a higher molecular weight component and (ii) a lower molecular weight component wherein the polymer has a polydispersity index of from about 10 to about 26; a zero shear viscosity of from about $5 \times 10^5$ Pa·s to about $2 \times 10^{14}$ Pa·s and a smooth-to-matte transition stress of from about 20 kPa to about 85 kPa at a shear rate of from about $1.5\ s^{-1}$ to about $17\ s^{-1}$.

20. A composition comprising the dual metallocene catalyzed polyethylene of claim 19 and a fluoroelastomer.

21. A pipe made from the composition of claim 20.

22. The polymer of claim 1 wherein the polymer is a copolymer of ethylene and 1-hexene.

* * * * *